United States Patent Office 3,346,718
Patented Oct. 10, 1967

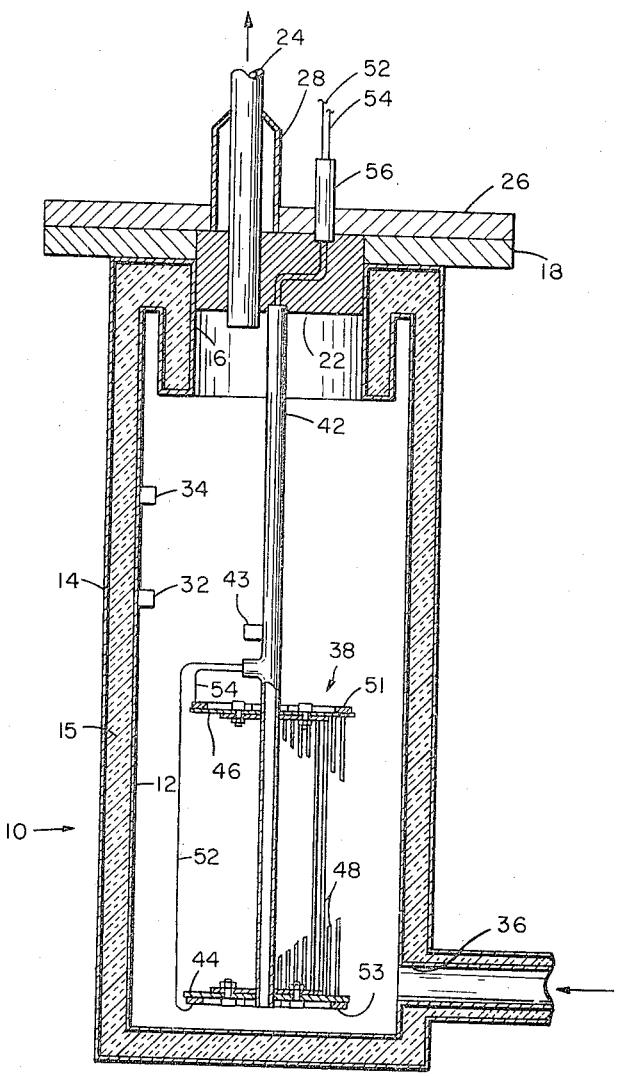

3,346,718
ELECTRICALLY HEATED CRYOGENIC LIQUID VAPORIZING APPARATUS
Gerald J. Cooley, Allentown, Joseph J. Gehringer, Emmaus, and Algird J. Karalis, Allentown, Pa., assignors, by mesne assignments, to the United States of America as represented by the United States Atomic Energy Commission
Filed July 27, 1965, Ser. No. 475,300
1 Claim. (Cl. 219—275)

ABSTRACT OF THE DISCLOSURE

A thermally insulated vaporizing container for a cryogenic liquid utilizing an electrically heated filament to selectably and controllably supply the vaporized liquid. The filament is a thin, bare ribbon designed to have a low mass so that the thermal inertia of the vaporizer is low. The container is provided with an opening. The opening is closed by a removable cover plate which supports the filament and an outlet means for the vaporized liquid. A plurality of probes are provided in the container for sensing the level of the liquid.

---

The present invention relates to cryogenic liquid vaporization and more particularly to cryogenic liquid vaporization utilizing an electrical source of heat.

Recent progress in the development of a hydrogen/oxygen fuel cell to power electric motors for vehicle propulsion or to operate other electrical equipment has created the need for liquid hydrogen storage and distribution apparatus capable of efficiently, effectively, and safely supplying the needs of the fuel cell when in service. When the fuel cell is being used in an application where power demands vary widely and suddenly, as in vehicle propulsion apparatus, the problems involved to meet these demands become complex. The hydrogen is stored in liquid form under very cold temperatures, as is understood in the art, and it is necessary to supply the proper amount of gaseous hydrogen in the proper amounts at the time it is needed, preferably with a fast thermal response.

A common arrangement for vaporizing the liquid hydrogen, in which heat from ambient air is utilized to do this, is not adequate for the particular task described above because of its slow response to changing condition and the required volume of apparatus to do the job.

The present invention makes it possible to accomplish in a compact unit an effective and highly responsive vaporization of the hydrogen in which control is simple, reliable, economic, and virtually instantaneous. In accordance with this invention a bare metallic ribbon is immersed in a small chamber of liquid hydrogen. Electric current is passed through the ribbon and the heat developed by resistance to the current effects the vaporization of the hydrogen. The use of a bare filament results in a heater having a very low mass so that the thermal inertia of the vaporizer is low. That is, when current is passed through the filament it heats up rapidly and when current flow is terminated its temperature drops off rapidly so that vaporization is initiated and terminated very rapidly. Hence, the dynamic response of this heater as a source of gaseous hydrogen is high. In addition, it is readily apparent that this heater requires a minimum of apparatus so that it is compact, simple in construction, and highly reliable.

It is thus a first object of the invention to provide a cryogenic liquid vaporizer.

Another object of the invention is the controlled vaporization of a liquid.

Still another object is to provide vaporizer apparatus for the controlled and selective conversion of liquid hydrogen to its gaseous form.

Other objects and advantages of the invention will become obvious from the following description taken with the accompanying drawing of a preferred embodiment of the invention.

The figure illustrates an elevation view in cross-section of a preferred embodiment of this invention.

Referring to the figure, there is illustrated a Dewar 10 consisting of an inner cylindrical vessel 12 surrounded by a jacket 14 separated by a vacuum space which is preferably filled with a suitable insulation 15. Dewar 10 has an upper opening 16 topped by a flange 18. A plug 22 of suitable insulating material supporting vapor outlet tube 24 fills opening 16. An upper flange 26 which would be bolted to flange 18, supports an extension 28 forming a vacuum space around outlet tube 24 to reduce heat entry. Mounted along inner vessel 12 are a pair of probes 32 and 34 which act as liquid level sensors. Liquefied gas, in this embodiment, hydrogen, is supplied to Dewar 10 through inlet 36 located near the bottom thereof.

For the controlled vaporization of the liquid contained within Dewar 10 there is supported therein a heater assembly 38 at the end of a rod 42 which is suspended at its upper end from plug 22. On rod 42 would be mounted another level sensor 43, if desired. Assembly 38 should have a diameter or width small enough to permit withdrawal through opening 16 for replacement or maintenance along with plug 22 as an integral unit. Heater assembly 38 consists of a pair of spaced rings 44 and 46 which, as is understood in the art, would be of material having electrically insulating qualities at cryogenic conditions. Mounted on rings 44 and 46 are contact rings 51 and 53 connected to the ends of a series of parallel arranged filaments 48. Each filament 48 is made from a material having suitable electrical resistance characteristics, as for example, any chrome nickel-iron alloy. Filaments 48 should have a large ratio of surface area to mass so that a flat, wide but thin ribbon of material is preferred for this purpose. If desired a single continuously wound filament may be used, however, any break in the filament would cause complete inoperativeness of the apparatus whereas in the preferred configuration of filaments 48 in parallel the device would continue to operate in the event of a break in some of the filaments.

Contact rings 51 and 53 are connected to electrical leads 52 and 54 which pass up through rod 42, plug 22, and a vacuum seal insert 56, thereby passing out of Dewar 10. A source of e.m.f. would be placed across leads 52 and 54 and current flow through filaments 48 would be controlled externally in conventional fashion to regulate the rate of vaporization of hydrogen.

An important feature of this invention is the use of a bare electrical filament of good heat transfer properties immersed in the liquid hydrogen. The filament used here thus is directly exposed to the hydrogen and is of low mass. In response to the initiation of current flow, or an increased flow of current, the hydrogen will vaporize or increase in the vaporization rate immediately, and when current flow is ended, the filament will cool off rapidly and vaporization will cease almost instantly. In a conventional liquid bath heater having a ceramic core and various coatings there would be a time lag both in the beginning of vaporization and when vaporization is expected to end. In the application of this apparatus to supply hydrogen to a fuel cell, a relatively quick-acting vaporizer is required in order to obtain the responses desired and also to eliminate the dangers arising from the discharge of excess hydrogen.

In the embodiment of the invention described above, there would be provided, as is understood in the art, but not shown here, suitable apparatus to supply liquid hydrogen to Dewar 10 to maintain a desired level. Sensors 32, 34 and 43 are provided for this purpose.

In a typical configuration of this invention, heater 38 was designed for 1.25 kw., which is the power required to vaporize of maximum of about 18.3 lb. of liquid hydrogen per hour.

It is thus seen that there has been provided a unique approach to the controlled supply of hydrogen vapor from a liquefied source of this gas. While only a preferred embodiment of the invention has been described it is understood that modification thereof may be made without departing from the principles of this invention, and that the invention is to be defined only by the appended claim.

We claim:

Cryogenic vaporization apparatus of fast thermal response comprising:
(a) a vessel consisting of a pair of walls separated by a vacuum space filled with insulation for containing under pressure a cryogenic liquid to be vaporized;
(b) means immersed in said liquid for the selective vaporization of controlled amounts of said liquid, said means being of relatively low mass to reduce thermal inertia, thereby acting to vaporize quickly upon actuation and to terminate vaporization quickly upon de-energization;
(c) said selective vaporization means comprising electrical resistance means consisting of a plurality of bare filaments in parallel in direct contact with said liquid to obtain the reduced thermal inertia as aforesaid, said filaments being wide, thin ribbons of relatively high surface area to mass ratio;
(d) said vessel being provided with an opening and outlet means for vaporized liquid;
(e) means supporting said vaporization means and said outlet means for closing said opening, said vaporization means being small enough to pass through said opening; and
(f) means comprising a plurality of probes mounted on said vessel and said supporting means for sensing the level of said cryogenic liquid.

References Cited

UNITED STATES PATENTS

| | | | |
|---|---|---|---|
| 1,448,510 | 3/1923 | Armstrong | 219—319 |
| 1,695,803 | 12/1928 | Eimer | 219—319 |
| 1,905,439 | 4/1933 | Carleton | 219—307 |
| 2,149,667 | 3/1939 | Clarke | 219—275 X |
| 2,158,458 | 5/1939 | Mathis et al. | |
| 2,433,374 | 12/1947 | Kruschke | 219—319 X |
| 2,596,327 | 5/1952 | Cox et al. | 219—552 X |
| 3,025,381 | 3/1962 | Pickering | 219—319 |

ANTHONY BARTIS, *Primary Examiner.*